Feb. 13, 1945. H. E. FERRAN 2,369,552
CHILD'S ENCLOSURE
Filed May 5, 1941 2 Sheets-Sheet 1
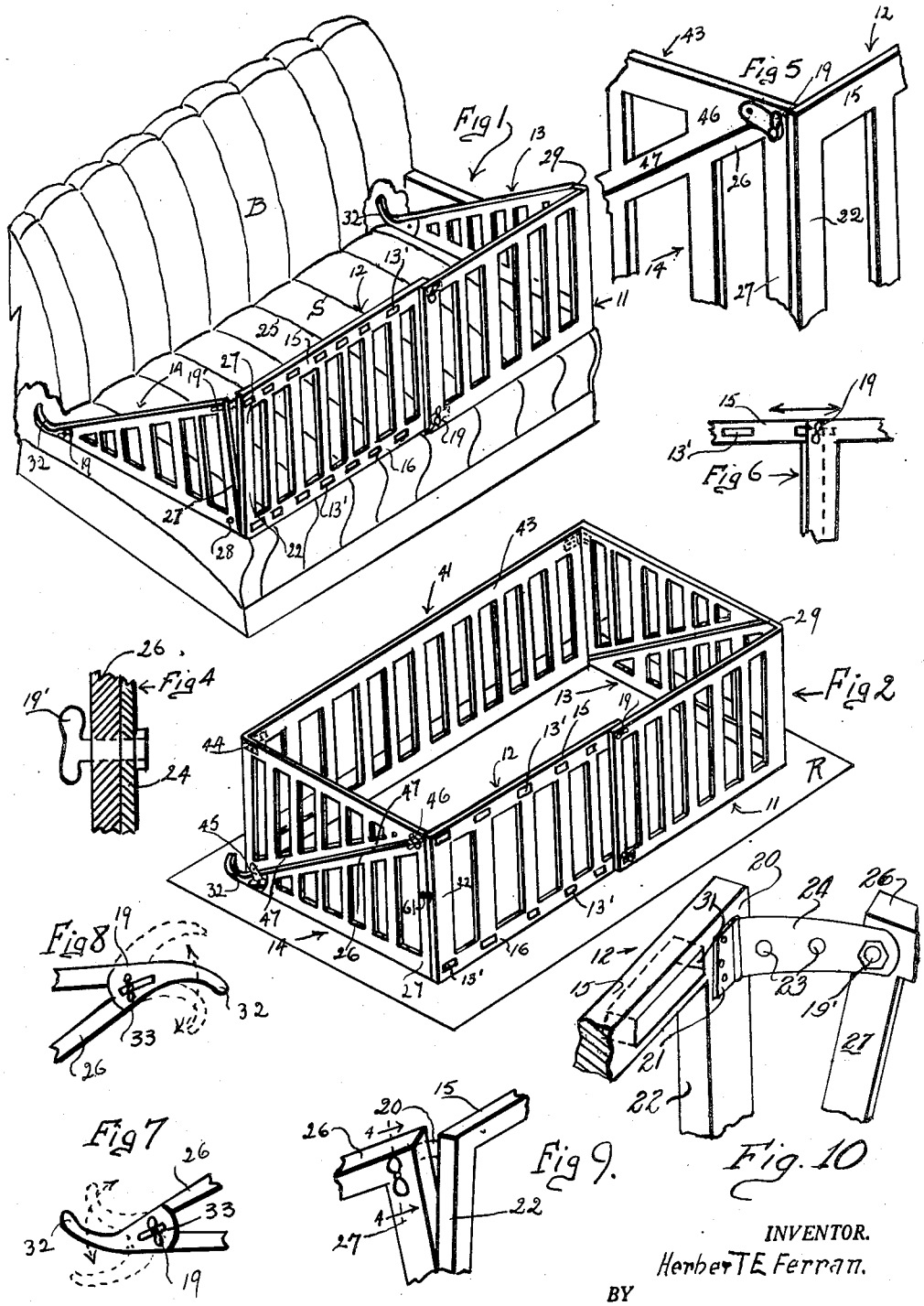
INVENTOR.
Herbert E. Ferran.
BY
Warren Dunham Foster
attorney.

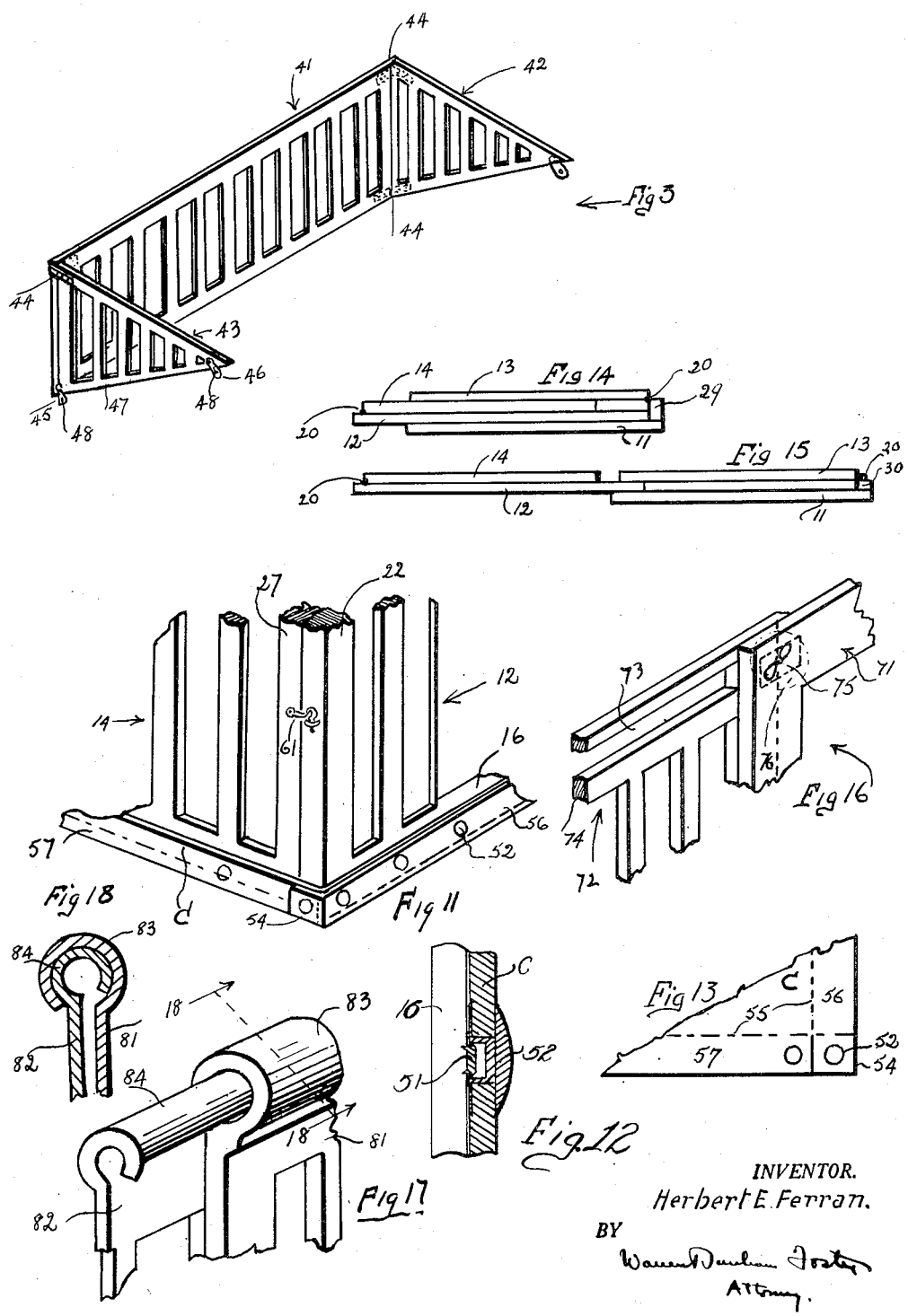

Patented Feb. 13, 1945

2,369,552

UNITED STATES PATENT OFFICE 2,369,552

CHILD'S ENCLOSURE

Herbert E. Ferran, Eustis, Fla.

Application May 5, 1941, Serial No. 391,988

11 Claims. (Cl. 5—94)

My invention relates to a device one form of which may be used as an accessory to an automobile and another form of which is adapted for use as an accessory to an automobile or independently thereof. I provide an enclosure which may be associated with the rear seat of an automobile in order to keep a young child from harm while giving him complete comfort and a large measure of freedom of action. In one form of my invention this enclosing device may also be employed outside of an automobile as, to cite only two examples, at a home within which the child and its parents are guests or upon a picnic.

I have found that a crib, of which there are several known types, which may be suspended from the top of an automobile is very satisfactory for a very young child who must be taken in an automobile with his parents but that after the child has grown to an active or crawling stage such an enclosure is neither safe nor pleasing to the child. Either he succeeds in escaping from the crib thus perhaps injuring himself or if successfully confined he becomes unhappy, perhaps vociferously so. Moreover such a suspended crib is not a practical enclosure after the family party has arrived at its destination.

I so design and construct this enclosure that it may be quickly adapted to any standard make of automobile, without the use of tools or the like and without demanding any structural change or defacement of the automobile. Also my invention is so designed that it may be quickly adapted to occupy either the entire portion of the rear seat of an automobile or a more limited area, say one-half. So far as known to me, all previous accessories of this kind proposed for use with automobiles have either been specially constructed to fit each particular type of seat and arm construction for each make and indeed each model of automobile, or have been lacking in rigidity and strength. The enclosure which I provide may be quickly adjusted, first, so that it forms a complete and rigid enclosure for any common type of back seat of any ordinarily used automobile irrespective of the width of the seat, pitch of the seat, angle of the back of the seat, or type or position of arms, and, second, so that the important front members which complete the enclosure of which the back of the seat and sides of the car provide the other portions are disposed vertically irrespective of the angles formed by the seat cushion with each other or with the car. It should be noted that such marked differences in seat dimensions and angles apply not only to the product of different manufacturers of automobiles, but also to different models put out by the same manufacturers in different years and even in the same year. Thus an enclosure made in accordance with my invention can be used by its owner with a plurality of automobiles, thereby making it unnecessary to purchase a new and special enclosure for each automobile owned at the same or successive periods.

My device, in one of its forms, may thereupon be removed from the automobile and quickly placed in rigid perpendicular arrangement to form a complete and efficient enclosure upon the ground or upon a floor. Thus the same device may be used to confine the child while en route by automobile and, with the instant addition of another part which has been carried compactly folded, converted into an enclosure which will contribute to his safety and comfort and to the ease of mind of his parents—and others—while away from home. Of course, this complete enclosure is also available for use in the child's own home, and again may be instantly converted for use in an automobile.

A chief purpose of my invention, therefore, is to provide an enclosure which is practicable either within an automobile or upon the ground or upon a floor and contributes to the child's happiness by giving him opportunity to move about but protects him from falls or wandering away.

Another chief object of my invention is to supply one model of a child's enclosure which can be adjusted for use with various automobiles, thus affecting great economy for manufacturer, dealer and user alike. A related object is to supply such an adjustable enclosure without the sacrifice of efficiency, rigidity and strength.

Another object is to supply an enclosure the enclosing members of which are disposed vertically, irrespective of the angle of the seat or back cushion with which they are used.

I accomplish all of the foregoing in structures which are inexpensive to manufacture, durable, not subject to damage, and can be packed for shipment or storage in very small space.

Other objects, characteristics and advantages of my invention will be clear from the following portion of this specification, the attached drawings, and the sub-joined claims. While for purposes of illustration I am showing preferred forms only of my invention, it will be readily understood that changes may be made therein without departing from the spirit of my invention or the scope of my broader claims.

In the drawings:

Figure 1 is an isometric view of a preferred form of my invention applied to the rear seat of an automobile, certain parts being omitted for clarity.

Figure 2 is an isometric view of an enclosure placed upon a flat surface as for example a rug upon a floor and forming a complete quadrilateral rigid perpendicular barrier.

Figure 3 (sheet 2) shows an adapter member which may be added to the device of Figure 1 in order to construct the enclosure of Figure 2.

Figure 4 is a fragmentary sectional view taken along the line 4—4 of Figure 9 looking in the direction of the arrows.

Figure 5 is an isometric fragmentary view showing a detail of the attachment of the structure of Figure 3 to that of Figure 1 in order to secure the result shown in Figure 2.

Figure 6 is a front elevational view of a detail showing the attachment of two front sections to each other.

Figure 7 is a detailed and fragmentary view showing the means for attaching the entire structure to an automobile with one arrangement of seat cushions.

Figure 8 is a detailed and fragmentary view showing similar means for attaching the structure to an automobile with another arrangement of seat cushions.

Figure 9 is an isometric and fragmentary view of a detail taken from the outside of the enclosure showing the attachment of the top portion of a triangular side member to a quadrilateral front member.

Figure 10 corresponds to Figure 9 but is taken from the inside looking out.

Figure 11 is an isometric and fragmentary drawing of a detailed showing of the attachment of a fabric floor to an enclosure.

Figure 12 is a section of a detail showing similar subject matter.

Figure 13 is a fragmentary top plan of a corner of this fabric floor member at a corner.

Figure 14 is a top plan view of the structures of Figure 1 folded for storage or shipment.

Figure 15 shows a modified enclosure of the type of Figure 1 folded.

Figure 16 shows a variant of the construction of the two front enclosing members.

Figure 17 is an isometric fragmentary view showing another variant construction of the front enclosing members.

Figure 18 is a section taken on the lines 18—18 of Figure 17 looking in the direction of the arrows.

My invention consists essentially of a main enclosing device and a supplementary enclosing device which may or may not be added to the main enclosure since the main enclosure may be used in an automobile independently.

As best shown in Figure 1, my invention is applied to an automobile having a rear seat with a bottom or seat cushion S and a back cushion B. A main enclosure may consist of two quadrilateral front enclosing members 11 and 12, which in function serve as a single member, and two generally right-triangular side or wing enclosing members 13 and 14 which, together with various instrumentalities, later described, attach these front members to the automobile in predetermined angular relation. As shown, these four members are slatted and constructed of plywood, but I may advantageously employ metal stampings or any other desired materials as later described in connection with one example. I much prefer, however, that all enclosing members be firm and rigid and adapted to be disposed and rigidly maintained vertically.

Each side or wing piece is preferably formed as a right triangle, with one of the short sides forming the right angle disposed adjacent the corresponding front enclosure and the other side forming the right angle generally engageable with the seat cushion S thus giving greater rigidity to the enclosure when in assembled relation with the automobile.

In order that the enclosure may be narrowed at will so that it may be adjusted for use with automobile seats of different widths or to be made to enclose less than the full width of a seat, say one-half, I supply a number of oblong slots 13' in the top slat 15 and bottom slat 16 of enclosing member 12, and two openings not shown one in the top and one in the bottom portion of member 11. Wing nuts 19 may be employed to join openings 17 with any corresponding and desired slots 13' thus making the width of the enclosing structure anything which is desired in greater than one-half of the total. Throughout this specification, for convenience, I use the word "wing-nut" to mean a bolt provided with a wing or other nut which can easily—but not too easily—be manipulated by hand. I prefer to use a bolt with a moderately steep pitch both to expedite manipulation as by a parent and to make somewhat difficult manipulation by a precocious child. If desired, this front enclosure may be made of a single section, the width of which cannot be varied. For any particular make of automobile such a structure is entirely satisfactory and within the scope of my invention. The alternative structures of Figures 16, 17 and 18 will later be described.

To attach each quadrilateral member to its corresponding triangular or side member, I may employ a simple hinge member 20 best shown in Figure 9. One leaf 21 of each such hinge is permanently fastened to an adjacent upright end piece 22 of the front enclosure 12. A plurality of holes 23 arranged along an arc in leaf 24 of hinge 20 correspond with one similar hole not shown formed in a top slat 26 of the side member 14. By the use of a wing bolt 19', as shown in Figures 4 and 10, it will be readily understood that the angular relation between the uprights 22 and 27 may be adjusted so that irrespective of the pitch of the seat cushion S, the front enclosing members 11 and 12 may always be vertical. A corresponding joint may be made at the upper front corners of the front piece 11 and the corresponding side piece 13. Corresponding joints may also be made at the two lower front corners of the front member 11 and side member 13 and front member 12 and side member 14 respectively. Since no separation is needed at the bottom, however, but merely provision for pivotal or rotational movement to permit separation at the top, it is not necessary to provide a plurality of holes in the hinged member. A bolt 28 may be loosely mounted in a hinge having one such opening.

If my invention is to be applied to a structure made for one particular type of vehicle, simple hinges may be employed.

If desired, by reinsertion of the wing nuts 19 in slots further to the left as viewed in the drawings, the front members may be reassembled in about half the width shown in Figure 1 so as to free a large portion of the seat. In order to make side enclosure 13 an effective barrier, a supplementary piece may be attached, but ordinarily is not necessary, since this narrow width generally will not be used except when an adult occupies the freed portion of the seat or objects are piled there which complete the enclosure.

In order to provide compensation for the slight difference in width which is caused by the double thickness of the two top sections of the two front enclosing members, as they overlap a vertical compensating slat 29 is rigidly attached to the front member at the junction of one of the enclosing members 11 and its cooperating triangular member 13, this upright being of sufficient width to space the triangular member 13 sufficiently far backwardly from the front member 11 so that when the four members are moved to their storage or transit position as shown in Figure 14, the four members lie flat against each other. As shown in Figure 15, however, an upright compensating slat 30 of half of the width of slat 29 permits the members to be folded flat, but without the intermediate step of shortening the front member. To receive the heads of the several wing bolts 19' so that the members may be folded flat against each other, small depressions are formed as shown at 31 in Figure 10. The members may be held in folded position in any conventional manner, as by a strap not shown.

In order firmly to position the above described structure in operative relation to the automobile with which it is used, two hook-like members 32 are provided and substantially providing extensions of the walls 14. By means of a wing nut 19 each may be fastened to an apical angle of its respective triangular member 13 or 14 at a position relatively distant to the point of attachment of each thereof with the front enclosure. In order to provide for a limited adjustment in the effective length of each side piece 13 or 14, the wing nut attaching each hook to its triangular member may work in a slot, shown as 33 in Figures 7 and 8. As shown in Figures 7 and 8 this hook may be moved up or down. Moreover it may readily be reversed so that it will occupy the position of Figure 8. For use in certain types of automobiles, it is necessary that this member be hooked downwardly back of the back portion of the bottom cushion rather than upwardly back of the back cushion. This attachment by hand operated wing nuts makes it perfectly possible for this adjustment readily to be made.

The above described enclosure may be used by itself and as an automobile accessory is complete in itself. I wish particularly to emphasize that such a structure independently of the attached device which I am about to describe may be employed by itself. While I prefer to make use of the adapter about to be described it is not necessary and indeed within an automobile has little or no utility.

The adapter alone is best shown alone in Figure 3 and its cooperation with the previously described enclosure in Figure 2.

The adapter consists essentially of a slatted back portion 41 and two cooperating side or right-triangular portions 42 and 43. For ease in storage, it is desirable that these pieces be hinged to each other as indicated at 44 but it is highly desirable that these hinges be applied to the outside of the structure for reasons which will later appear. If desired, the back portion may be made adjustable, but since it is intended not for use in an automobile but outside of any vehicle such an arrangement is not necessary. Alternatively the back and side portions may be made solid or formed in any desired manner.

Small attaching plates 45 and 46 are loosely bolted to the outside of the bottom rail 47 of each triangular enclosing portion at each extremity so that rotational movement about each bolt as a pivot is possible. Openings 48 in each plate are provided for the reception of the winged nuts 19 previously described. The assembly of this enclosure with the one previously described is a very simple matter. Wing nuts 19 of the main enclosure are merely released, their bolts placed through the openings 48, and the wing nuts again tightened thus providing a rigid quadrilateral enclosure complete upon all sides.

In order to prevent the child from lifting the enclosure and hence escaping, a simple fabric floor C is provided. In view of the rigidity and strength of the remainder of the enclosure, a fabric floor is satisfactory. Male snap fasteners 51 are attached to all bottom slats such as 16 and corresponding female members 52 attached to the fabric floor C. This floor may quickly be placed in position by the use of these fasteners, as indicated in Figures 11 and 12. In order to make clean joints at each corner, a tongue 54 is cut as shown in Figure 13, in which the fold lines are indicated by dotted lines 55. As a consequence, when the edges 56 and 57 are folded along these lines 55, the tongue 54, which extends from the edge 56, may be buttoned over the edge 57 thereby making a smooth corner as best shown in Figure 11. The entire structure is shown as upon a rug R.

Rigidity in this form of my invention is secured by placing the hinges 44 on the outside of the supplementary enclosure, thus preventing a collapse of this portion of the complete enclosure and tending to make the remainder of the structure rigid. A hook 61, shown in Figures 2 and 11, assists in holding the entire structure truly quadrilateral.

Two alternative forms of construction are shown in Figures 16 and in 17 and 18 respectively.

As shown in Figure 16, a front enclosing member 71 may be adjustably joined to another front enclosing member 72 by means of a long slot 73 cut in a top piece 74 of member 72 and a wing nut 75 attachable to a bolt with a large head 76. A similar construction at the bottom may be employed. As will be understood by reference to Figure 16, members 71 and 72 may be longitudinally slid in relation to each other after wing nut 75 is released and then placed in relatively fixed relation to each other by a tightening of said wing nut.

As shown in Figures 17 and 18 front enclosing members 81 and 82 may be made of metal, preferably of a spring-like character, the top portions 83 and 84 being formed into rolls incompletely cylindrical in cross section, roll 84 being slipped within the interior of roll 83. The resilient character of the metal forces the two partial cylinders into contact. One may be slid upon the other, this resilience serving to hold both in the adjusted position.

The operation of this form of my device is simple.

A family starts upon a holiday expedition, it may be said in illustration. The primary enclosure is placed upon the back seat of an automobile, after having been properly adjusted, and the hooks 32 are slipped about the appropriate cushions. The secondary enclosure, duly folded, is placed in the trunk of the automobile. After the arrival at the destination, the secondary enclosure is bolted into place by the loosening of four wing nuts and their reinsertion and the fabric floor is snapped into position. In a matter of a few seconds only there has been provided a safe and rigid enclosure for the visiting child so that his safety and happiness—as well as the peace of mind of parents and hosts— have been conserved. Upon the return journey, this simple process is reversed.

As stated, however, in one form of my invention the primary enclosure is complete in itself and may be used alone.

The advantages of my invention will be understood from the foregoing description, the subjoined claims, and the attached drawings. I provide a simple safe compact inexpensive and adjustable device which may be used as an enclosure for a child in any standard make of automobile and also if desired as an enclosure outside of such vehicle.

I claim:

1. An enclosure for use upon the seat of an automobile having a seat member and a back member disposed at substantially right angles to each other, including a substantially rigid front wall, and a pair of spaced substantially rigid end walls connected to said front wall and extending in the same direction therefrom, said end walls being provided with extensions adapted to be inserted between said seat and back members at the juncture thereof, whereby to secure said enclosure upon the seat member and to prevent shifting thereof relative to said back member in a direction away from the latter.

2. A child's enclosure for use upon the seat of an automobile which has a seat cushion and a back cushion therefor, said enclosure comprising a rigid front member, a pair of spaced rigid side members, each of a length substantially equal to the width of said seat and extending from said front member in the same direction and substantially parallel to each other, a pair of holding members engageable with said seat at a point adjacent the juncture of said back and bottom cushions for holding said members in relatively fixed relation thereto when said enclosure is in assembled relation with said seat, means for attaching one each of said holding members to one each of said side members, and means for movably connecting the other ends of said side members to said front member, said last-named connecting means including instrumentalities for adjusting the angle of the front member with respect to the side members, whereby said front member may be vertically and rigidly disposed with respect to the front face of the bottom cushion irrespective of the angles of said cushions with respect to each other and the automobile.

3. In combination, an automobile, a seat, a bottom cushion for said seat, a back cushion for said seat, a rigid rectangular front member, two rigid side members each attached to a different short side of said front member and extending therefrom in the same direction and substantially parallel to each other and of a length substantially equal to the width of said seat, and two rigid connecting members, each of said connecting members comprising a relatively wide and flat portion merging into the side members and pivotally attached to an end each of said side members, a relatively elongated and narrow portion extending from said flat portion adapted to pass between said cushions in contact with both thereof, and a hook-like portion extending away from said narrow portion in a general right angled relation thereto and adapted to engage against the rear of one of said cushions to thereby rigidly hold said front member in predetermined relation to said automobile seat in a line adjacent the front edge thereof, whereby said automobile seat and said front and side members cooperate to form a complete enclosure for a child.

4. In combination, an automobile and a child's enclosure; said automobile having a seat and a bottom cushion and a back cushion therefor; said enclosure comprising a rigid oblong front member, two rigid side members, each of a length substantially equal to the width of said seat and extending from a different short side of said front member in the same direction and substantially parallel to each other, a member attached to one end of each of said side members and engageable with said seat at a point adjacent the junction of said back and bottom cushions for holding said members in relatively fixed relation thereto, and means for adjustably attaching an end of each of said side members, said end being one relatively remote from said previously mentioned point of attachment, to said front member at such an angle that said front member is vertically and rigidly disposed adjacent the front of said bottom cushion irrespective of the angles of said cushions in respect to each other and the automobile, whereby said seat and said members cooperate to form a complete enclosure for a child.

5. In a device of the character described, a rigid substantially oblong front member, two rigid side members of substantially equal length, means for attaching each of said rigid side members to one of the short sides respectively of said front member so that they extend therefrom in the same direction, said attaching means including instrumentalities affording movement of each of said side members relative to said front member upon a vertical axis and instrumentalities affording adjustment upon a horizontal axis, and means for attaching each of said side members at an extremity thereof relatively remote from that which is attached to said front member to a back portion of a seat of an automobile.

6. In a device of the character described, a rigid substantially oblong front member, two rigid side members, means for attaching each of said rigid side members to one of the short sides of said front member, each of said attaching means including a first hinge of which a first leaf is fastened to one of said members near the top thereof, means for selectively attaching the second leaf of said hinge at a plurality of different spaced points to said other member thereby affording adjustment of the angular relation of the two members, a second hinge for attaching said members near the bottom thereof, a first leaf of said second hinge being attached to the one of said members to which the first leaf of said first hinge is attached and the second leaf of said second hinge being rotatably attached to said other member, and means for attaching each of said side members at an extremity thereof relatively remote from that which is attached to said front member to a seat of an automobile.

7. In combination, a two-part enclosing structure; a first of said parts including an enclosing front oblong member, two rigid side members, one hinged upon a vertical axis adjacent one short end of said front member and the other hinged upon a vertical axis adjacent the other short end of said front member; said second part including an oblong back enclosing member of substantially the same length as said front member of said first part, two rigid side members, one hinged upon a vertical axis adjacent one short end of said back member and the other hinged upon a vertical axis adjacent the other short end of said back member; and means for attaching each of the side members of one of said parts to a corresponding side member of the other of said parts, said side members being of such length and configuration that when so attached they complete a quadrilateral structure.

8. An enclosure for use upon the seat of an automobile having a seat member and a back member disposed at substantially right angles to each other including a substantially rigid front wall, and a pair of spaced substantially rigid end walls connected to said front wall and extending in the same direction therefrom, said end walls being provided with extensions which are angularly adjustable with respect to said end walls and adapted to be inserted between said seat and back members at the juncture thereof, whereby to secure said enclosure upon the seat member and to maintain said front wall in substantially vertical position regardless of the angular disposition of the top surface of the seat member.

9. A convertible enclosure of the character described, including a pair of complementary sections one of which is adapted for independent use with an automobile having a seat and back member disposed at substantially right angles to each other so as to form with said seat and back members an auxiliary enclosure, each of said sections comprising a vertically disposed front wall and a pair of spaced substantially parallel end walls connected to said front wall and extending therefrom in the same direction, said end walls of each section having a vertical dimension less than the vertical depth of its attached front wall, means for connecting adjacent end walls of the complementary sections together so as to form a pair of end walls each having a vertical depth substantially equal to the vertical depth of said front walls, and means carried by the free ends of the end walls of one section for disposal between the seat and back members of an automobile at their juncture so as to form therewith an auxiliary enclosure independent of said other complementary section.

10. A convertible enclosure of the character described, including a pair of complementary sections one of which is adapted for independent use with an automobile having a seat and back member disposed at substantially right angles to each other so as to form with said seat and back members an auxiliary enclosure, each of said sections comprising a vertically disposed front wall and a pair of spaced substantially parallel end walls connected to said front wall and extending outwardly therefrom in the same direction, said end walls of each section having a vertical depth less than the vertical depth of its attached front wall, the means for connecting the end walls and the front wall of one of the sections being adjustable so as to vary the relative angle therebetween, means for connecting adjacent end walls of the complementary sections together so as to form an enclosure having a pair of end walls each having a vertical depth substantially equal to the vertical depth of said front walls, and means carried by the free ends of the end walls of the said one section for disposal between the seat and back members of an automobile at their juncture so as to form therewith an auxiliary enclosure independent of the other of said complementary sections.

11. In a device of the character described, two oblong enclosing members one of which is formed with openings at a plurality of positions along its top and bottom edges and the other of which has an opening in its top and bottom edge respectively for cooperation with said first named openings, bolt-like members adapted to be passed through each of said second named openings and any one of said first named openings for holding said two enclosing members in adjusted and overlapping relation with each other whereby their total effective length may be varied, two side members each attachable at one end thereof to each of said oblong enclosing members at their edges relatively distant from their portions which overlap, means for attaching each of said side members at the end thereof opposite that which is attachable to said oblong enclosing members to a relatively fixed support, and means for attaching said front enclosing members in a plurality of predetermined angular relations to each of said side members whereby both the effective width of said front enclosing members and their angular relation to said relatively fixed support may be changed.

HERBERT E. FERRAN.